United States Patent [19]
Brastins et al.

[11] 4,166,270
[45] Aug. 28, 1979

[54] TESTING OF SEISMIC STREAMERS

[75] Inventors: Auseklis Brastins, Pittsburgh; Ralph L. Stenger, Jr., Oakmont, both of Pa.

[73] Assignee: Gulf Research & Development Company, Pittsburgh, Pa.

[21] Appl. No.: 872,473

[22] Filed: Jan. 26, 1978

[51] Int. Cl.² .............................................. G01V 13/00
[52] U.S. Cl. .................................. 340/5 C; 73/1 DV; 340/7 R
[58] Field of Search ................ H04R/29/00; 340/5 C, 340/7 R, 15.5 TS; 73/1 DV

[56] References Cited
U.S. PATENT DOCUMENTS

| | | | |
|---|---|---|---|
| 2,918,651 | 12/1959 | Podolak et al. | 340/5 C X |
| 3,659,255 | 4/1972 | Trott | 340/5 C |
| 3,864,664 | 2/1975 | Trott et al. | 340/5 C |

Primary Examiner—Richard A. Farley

[57] ABSTRACT

A test circuit is installed in each channel of a seismic streamer towed behind an exploration vessel in offshore seismic exploration. The test circuit is adapted to generate a signal in the channel that is indicative of a characteristic of the channel. The signal is transmitted to the vessel for recording and observation aboard the vessel through the existing cables in streamers used to transmit seismic signals. A signal from onboard the vessel operates switch means which normally disconnect the test circuit and close the primary circuit of the channel to place the test circuit in the primary circuit of the channel. A test circuit is disclosed which includes a relaxation oscillator adapted to indicate the current leakage resistance of the primary circuit of the channel by changes in the frequency of the oscillator and means for applying a step voltage to the primary circuit and indicating the response of the primary circuit of the channel to the step voltage. All of the channels in the streamer can be tested simultaneously and the characteristics of each channel recorded on the vessel.

15 Claims, 3 Drawing Figures

TESTING OF SEISMIC STREAMERS

BACKGROUND OF THE INVENTION

1. Field of the Invention

This invention relates to seismic exploration in offshore areas and more particularly to a system for testing seismic streamers used in offshore exploration for oil and gas structures.

2. Description of the Prior Art

Many of the most promising areas for exploration for oil or gas are in offshore areas. Seismic surveys conducted from vessels from which streamers of hydrophone channels are towed are an important tool used in locating and evaluating offshore structures which may contain oil or gas. Signals picked up by the hydrophones are transmitted through the streamer back to the exploration vessel where they are recorded for subsequent interpretation.

The streamers towed behind the exploration vessels may include, for example, 48 to 96 hydrophone channels for sections connected end to end. Each channel is usually 50 to 250 feet long; consequently, the streamer may be two miles or more in length. Typically, 32 hydrophones are connected in parallel in each channel. The channels include a tube of rubber, vinyl chloride or other elastic material housing the hydrophones. The tubes are filled with a liquid of high electrical resistivity such as highly refined kerosene to transmit impulses received in the seismic operations to the hydrophones and to mimimize invasion of the channel by sea water. A matching transformer in each channel transforms the signal developed by the primary circuit in the channel for transmission from the channel.

The channels are connected together end to end at boots to form the streamer. Electrical connections are carried from each matching transformer through each of the channels and boots nearer the vessel to the vessel for separate recording of the signals from each of the channels. Suitable connections of the electrical conductors are made in each of the boots. Strain cables for carrying the mechanical load of the streamer caused by drag as the streamer is towed extend from the vessels through each of the channels and boots.

During use of the streamer, salt water may invade a channel and reduce the current leakage resistance of the primary circuit in the channel. The lower resistance in the channel causes a loss of sensitivity as well as a loss of low frequency response and a phase shift. Because the signals of most value in seismic exploration are in the low 8 to 60 hertz range, means for checking the channels to determine whether or not there has been salt water invasion are particularly desirable. Moreover, during the assembly of a streamer, either initially or after repairs, there may be reversal of polarity of the signal delivered to the vessel because of reversals in connection of the cables. Such reversals of polarity can add greatly to the difficulty in interpretation of the records made during the seismic survey.

In U.S. Pat. No. 2,918,651 of Podolak et al and U.S. Pat. No. 3,659,255 of Trott apparatus is described for calibrating hydrophones for use in offshore exploration. In the apparatus described in each of the patents, a test is made on a single hydrophone. No indication is given of the output of the primary circuit of a channel of a streamer when a plurality of hydrophones are assembled in a channel. In U.S. Pat. No. 3,864,664 of Trott et al, apparatus is described which will allow testing individual hydrophones as assembled in seismic streamers. The apparatus consists of a tubular element that may be mounted on shipboard and through which the streamer is pulled. Each hydrophone element in the arrangement that is to be checked is positioned centrally in the testing apparatus. It is apparent that testing an entire seismic streamer will be a time-consuming process as the two miles or more of oil-filled tubes must be pulled through the calibrator.

SUMMARY OF THE INVENTION

This invention resides in apparatus for simultaneously testing each channel of a seismic streamer while it is being towed behind a seismic exploration vessel. A test circuit in each channel is connected by switch means operable in response to a signal from aboard the exploration vessel in series with the primary of the matching transformer in the primary circuit of each channel. The test circuit is adapted to measure a characteristic of the primary circuit indicative of proper operability of the circuit. The measurement of the characteristic of the primary circuit is transmitted to the vessel for recording or observation through the existing system through which the seismic signals are normally delivered to the vessel. In a preferred embodiment, the test circuit generates a signal that indicates the resistance of the primary circuit of the channel to current leakage and the response of the channel to an applied step voltage.

DESCRIPTION OF PREFERRED EMBODIMENT

Figures 1, 2:
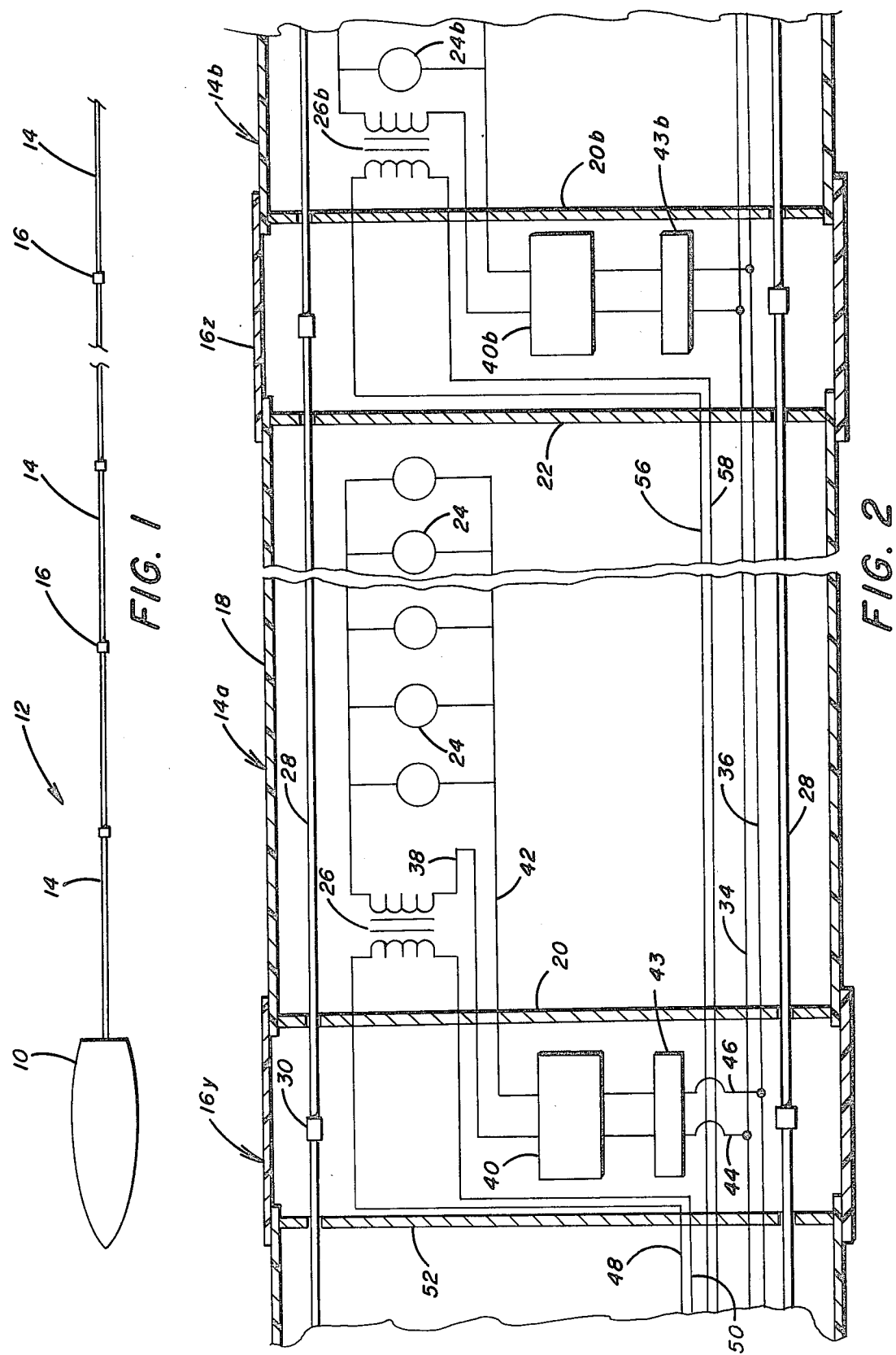
FIG. 1 is a schematic view of a vessel towing a seismic streamer showing only part of the streamer.
FIG. 2 is a schematic view in section showing parts of two channels with the test circuits located in the connecting boots.

Referring to FIG. 1, a vessel 10 is shown towing a streamer indicated generally by reference numeral 12. The streamer consists of a plurality of channels indicated collectively by reference numeral 14 joined together at their ends by boots 16. Each of the channels 14 encloses a matching transformer for delivery of signals derived from signals generated by hydrophones in the channel to display and recording apparatus, not shown, onboard the vessel. To simplify the description of this invention, apparatus onboard vessel 10 for observing and recording the signal delivered from each channel will be referred to herein as recording apparatus. In a typical streamer, there may be 48 channels, each of which may be 250 feet long. The length of the streamer may, therefore, be two or more miles. Typically in each channel 32 hydrophones will be connected in parallel. The number of channels in a streamer, the length of each channel and the number of hydrophones in each channel are not restricted to the numbers given. Those numbers are merely exemplary of typical streamer structure.

Referring to FIG. 2 of the drawings, two channels indicated generally as 14a and 14b are shown connected together by a boot indicated by reference numeral 16z. Channel 14a is connected at the end opposite boot 16z by a boot 16y to the adjacent channel nearer the seismic vessel 10 in the streamer. Each of the channels consists of a tube 18 of vinyl chloride polymer, rubber or other similar material closed at its end adjacent boot 16y by a bulkhead 20 and at its end adjacent boot 16z by bulkhead 22. Within channel 14a, a plurality of hydrophones 24 are connected in parallel as part of the primary circuit that develops the seismic signal for transmission to the recording apparatus onboard vessel 10. Also, in channel 14a, as part of the primary circuit, is a matching transformer 26. Hydrophones connected in parallel in the manner shown for boot 14a and including a matching transformer similar to transformer 26 are included in each of the channels. In channel 14b, the hydrophones are indicated by reference numeral 24b and a matching transformer by reference numeral 26b.

A pair of strain cables 28 extend from the vessel 10 through each of the channels to the end of the streamer. The strain cables which may be stainless steel cables are connected by suitable connectors indicated by reference numeral 30 in each of the boots as the streamer is assembled. An extra pair of leads 34 and 36 extend from the vessel 10 through each of the channels to the end of the streamer. Ordinarily, the streamer will include more than one pair of extra leads extending the length of the streamer. They can be used for various purposes such as delivery of signals to the vessel from channels which may be added subsequently to the streamer.

Each channel and each of the boots 16z are filled with a liquid of high electrical resistivity such as highly refined kerosene for transmission of seismic signals to the hydrophones and to impede or minimize invasion of salt water into the streamer. The passage of the various electrical leads through the bulkheads at the end of each channel will generally be by means of suitable connectors; however, to simplify the drawings, the conductors have been shown as merely extending directly through the bulkheads. All of the apparatus metioned above in the streamer is part of conventional streamer construction.

The test module of this invention is connected directly in the primary circuit of each channel of the streamer. The test module includes a test circuit 40 adapted to generate a signal to be imposed in the primary circuit of the channel and a control circuit 43 adapted to activate the test circuit in response to a signal delivered from the vessel. Referring to channel 14a, a lead 38 extends from the primary of transformer 26 through bulkhead 20 into the space in the boot 16y where it is connected to the test circuit 40. A lead 42 from the test circuit passes through the bulkhead 20 and is connected with the hydrophones 24. The control circuit is connected by leads 44 and 46 to the extra pair 34 and 36 of conductors that run the length of the streamer. The test module is illustrated located in the boot at the end of the channel, but could be installed with the channel. It is preferred that the test circuit be in an adjacent boot to allow maintenance of the test circuit without disturbing the channel. It is essential that the test circuit be installed "at the channel" and that term is used in the specification and claims to indicate that the test circuit is installed in a channel or in a boot adjacent to the channel.

A pair of electrical conductors 48 and 50 extends from the secondary of the matching transformer 26 through bulkhead 20 and a bulkhead 52 of the channel adjacent channel 14a and through all of the channels between channel 14a and vessel 10 to recording apparatus on the vessel. Similarly, leads from matching transformer 26b extend through bulkhead 20b to leads 56 and 58 through channel 14a and the other channels between channel 14b and the vessel 10 to the recording apparatus onboard the vessel. Thus, the channel 14 closest to the vessel will include lead lines from each of the channels in the streamer for delivery of signals from each channel to the recording apparatus on the vessel.

The test circuit 40 is adapted to produce a signal in the primary circuit of each channel that is indicative of the condition of the primary circuit in the channel for transmission by the existing wires in the streamer to the vessel for onboard readout. In response to a DC signal from onboard the ship delivered through extra leads 34 and 36, the test circuit for each channel is placed in the primary circuit of the channel to develop the signal which is transmitted back to the vessel.

A principal cause of deterioration of a channel is invasion of the channel by salt water which reduces leakage resistance in the primary circuit and thereby diminishes the sensitivity of the channel. The test circuit could be adapted, for example, to determine the salt concentration as a measure of the salt water invasion. Because the presence of salt water within the channel will have a direct effect of reducing the leakage resistance across the primary circuit, a simple test circuit which develops a signal that is indicative of the leakage resistance across the primary circuit can be used. It is preferred that the test circuit include means for measuring more than one characteristic of the primary circuit in the channel. In this invention, switching from one test to another is accomplished by reversal of the DC signal polarity of the leads 44 and 46 to the test circuit to actuate control circuits for switching from a circuit adapted to measure one characteristic to a circuit adapted to measure another characteristic.

Figure 3:
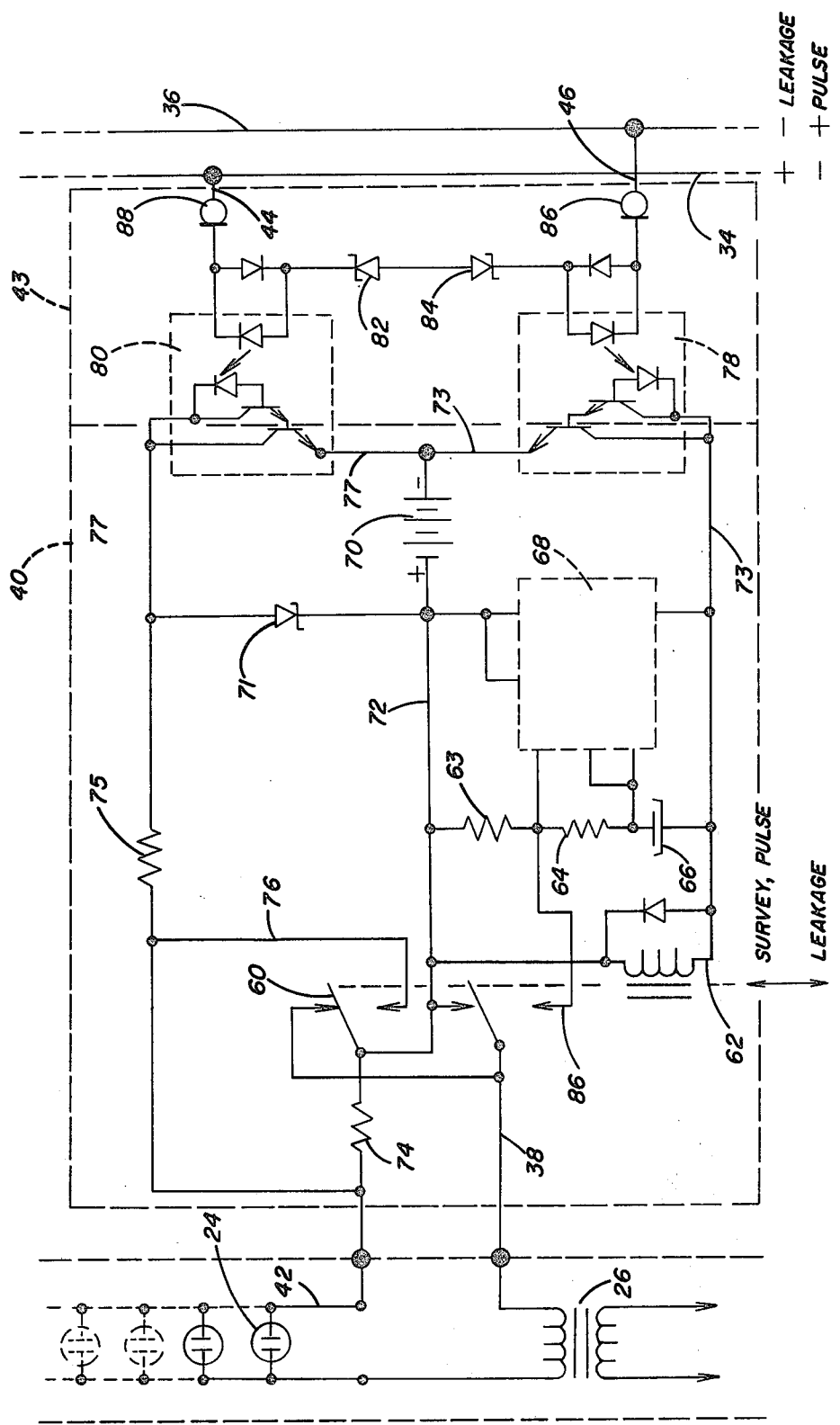
FIG. 3 is a circuit diagram of one embodiment of the test apparatus of this invention.

Referring to FIG. 3, a preferred specific embodiment of the invention utilizing a test circuit adapted to develop a signal indicative of changes in the leakage resistance across the hydrophones and the response of the test circuit in the channel to a step voltage is illustrated. The test circuit includes a switch 60 that in the normal survey position shown bypasses the test circuit and closes the primary circuit of channel 14a. Switch 60 is operated by a relay 62 to connect the test circuit in series with the primary of the transformer circuit for the indication of leakage across the primary circuit of the channel. The leakage is indicated by the change in frequency of a relaxation oscillator in the test circuit which includes resistances 63 and 64 and capacitance 66 connected to a general purpose timer within the box 68 indicated by a dashed line. A suitable timer is an integrated circuit, general purpose timer designated as SE555CV sold as a commercial product by Signetics. The test circuit includes an 8-volt battery 70 connected through line 72 to the primary circuit lead line 42 and through a lead line 73 to relay 62. A resistance 74, hereinafter described, is included in the test circuit between line 42 and the switch 60 for the testing of response of the circuit to a step voltage. Resistance 74 is preferably bypassed by a line 76 during the leakage testing phase of the testing operation. Because of the low resistance of resistance 74, line 76 may be omitted without significant effect on the leakage test.

Current from battery 70 through line 73 to the relay 62 is controlled by the conrol circuit 43 that includes an optoisolator 78 that is actuated by a signal delivered to the test circuit through the extra pair of leads 34 and 36. Similarly, the control circuit 43 includes an optoisolator 80 to control current through a lead 77 and resistance 74 to apply a step voltage for the pulse testing. Optoisolators 78 and 80 provide control of the test circuit without introducing stray currents into the test circuit from test circuits in the other channels. Suitable relays could be used in place of the optoisolators to give the desired isolation of the test circuit from leads 34 and 36. To prevent actuation of the test circuit by noise, Zener diodes 82 and 84 are connected in the optoisolator circuit from extra lead 34 to extra lead 36. Diodes 82 and 94 prevent current flow through optoisolators until the voltage exceeds a threshold value. To prevent excessive current flowing through the optoisolators, current limiting diodes 86 and 88 are connected in the lines from the leads 36 and 34, respectively, to the test circuit. Those diodes limit the current through the optoisolators regardless of the voltage applied within their rating and allow interchangeability of the channels in the streamer.

In the operation of the embodiment of the invention illustrated in FIG. 3 when it is desired to measure current leakage in the channels, lead 34 is made positive by suitable controls onboard vessel 10. Current then flows through optoisolator 78 to close a transistor therein and allow current to flow through line 73 and relay 62 to move switch 60 from the normal survey position shown in FIG. 3 to open the primary circuit of the channel and place the relaxation oscillator in series with the primary of transformer 26. The relaxation oscillator is then in the primary circuit of the hydrophone channel. The oscillator develops a signal in the primary circuit which is transmitted through transformer 26 and lead lines 48 and 50 to recording apparatus on the vessel. If there is salt water invasion of the channel, the current leakage across the hydrophones increases the frequency of the relaxation oscillator with the result that a changed signal is delivered to the recording means onboard vessel 10; thus, the necessity of replacing the channel can be determined without going through the time-consuming test procedures heretofore available. Such testing of all channels in the streamer is conducted simultaneously and can be accomplished during periods when the survey vessel is turning between traverses in a seismic survey.

To test the pulse response of the channel, the polarity of leads 36 and 34 is reversed from onboard vessel 10. Current flows through optoisolator 80 to close the circuit from the battery to lead 42 of the primary circuit. Since current is not passing through the relay 62, switch 60 returns to its normal position shown in FIG. 3. A step voltage is introduced into the primary circuit in the channel by closing the circuit including battery 70 and resistance 74 and the response of the channel is transmitted through transformer 26 and leads 48 and 50 to the recording apparatus onboard the vessel.

The step response of all channels can be displayed on the onboard camera for immediate similarity check or recorded on tape for Fourier transform analysis to obtain the actual amplitude and phase response versus frequency for each channel before, during or after a survey. Polarity reversals in the cable are immediately evident. The gain of the channel can be measured if a normal pulse amplitude is established for each channel to account for the difference in losses in cables to near and far channels. The outputs recorded on the vessel can be used for correction of data taken during the survey. If the corrections appear to be excessive, the pulse test will indicate the necessity of repairing the streamer. After testing, lines 34 and 36 are returned to a neutral condition. Diodes 82 and 84 prevent actuation of the optoisolators by noise and thereby avoid turning on the test circuit while a survey is in progress.

The test circuit for applying a step voltage in the primary circuit of the channel includes a Zener diode 71 that maintains a constant pulse amplitude as the battery voltage decreases with use. Other means such as an integrated circuit regulator could be used for that purpose. Resistance 75 provides means for adjusting the amplitude of the pulse test.

The testing system of this invention permits rapid testing of each channel of a seismic streamer while a streamer is being towed behind a seismic vessel. Utilization of the signal delivery system of the streamer and the recording and display means on the vessel for seismic signals allows simultaneous testing and recording of the results of the test for each channel in the streamer. By including a separate test circuit in each channel, replacement channels can be readily placed in the streamer without dismantling the entire streamer, and the replacement channel is fully equipped for testing.

We claim:

1. A system for testing hydrophone channels in a streamer trailing a seismic prospecting vessel, each channel in the streamer having a primary circuit for generating a signal, said streamer having means for delivering the signal from the primary circuit in each channel to recording means on the vessel, comprising a test circuit located at the channel to be tested adapted to develop a test signal that when imposed in the primary circuit develops a response signal indicative of a characteristic of the channel, a control bus extending from the vessel through the streamer operatively connected to the test circuit, control signal generating means on the vessel connected to the control bus for delivering a control signal from the vessel through the control bus to activate the test circuit and impose the test signal from the test circuit in the primary circuit to develop in the primary circuit the response signal indicative of the characteristic of the channel whereby the signal is delivered to the recording means on the vessel.

2. A system as set forth in claim 1 characterized by switch means in the primary circuit normally short circuiting the test circuit, said switch means being operatively connected to the control bus for activation by the control signal delivered through the control bus to place the test circuit in the primary circuit of the hydrophone channel.

3. A system as set forth in claim 2 characterized by the test circuit including a relaxation oscillator adapted to impose in the primary circuit of the channel a signal having a frequency indicative of the electrical leakage in the channel.

4. A system as set forth in claim 1 characterized by the test circuit including a relaxation oscillator and the frequency of the response signal produced in the primary circuit by the test signal indicating electrical leakage in the channel.

5. A system as set forth in claim 1 in which the test circuit includes a resistance and means for causing a current to flow through the resistance to produce a step voltage as a test signal which is imposed on the primary circuit of the channel.

6. A system as set forth in claim 1 characterized by the streamer comprising a plurality of channels connected end to end by boots and the test circuit for a channel to be tested being located in the boot at one end of the channel.

7. A system as set forth in claim 1 characterized by the test circuit including a relaxation oscillator, a battery, means connecting the relaxation oscillator across the battery, said means connecting the relaxation oscillator including switch means connected to the control bus operative in response to the control signal to close the circuit through the relaxation oscillator.

8. A system as set forth in claim 7 in which the switch means connected to the control bus is an optoisolator.

9. A system for testing hydrophone channels in a streamer trailing a seismic prospecting vessel, each channel of the streamer having a primary circuit including hydrophones for generating a signal, said streamer having means for delivering the signal for the primary circuit in each channel to recording means on the vessel, comprising a test circuit located at the channel, said test circuit being adapted to develop selectively in the primary circuit a first signal indicative of a first characteristic of the channel and a second signal indicative of a second characteristic of the channel, and a control circuit adapted to activate selectively the test circuit to develop the desired signal in the primary circuit of the channel, said control circuit including a two-wire control bus having a first wire and a second wire extending through the streamer, means connecting each wire of the two-wire control bus to the test circuit responsive to a positive charge on the first wire of the control bus to activate the means to develop the first signal in the primary circuit and responsive to a positive charge on the second wire of the control bus to activate the test circuit to develop the second signal in the primary circuit, and means on board the vessel connected to the two-wire control bus for applying the desired charge in the wire of the control bus.

10. A system as set forth in claim 9 characterized by switch means operatively connected to the control bus and adapted to connect the test circuit to develop the first signal in the primary circuit when the first wire of the control bus is positive, and to develop the second signal in the primary circuit when the second wire of the control bus is positive.

11. A system for testing hydrophone channels in a streamer trailing a seismic prospecting vessel, each channel in the streamer having a primary circuit including hydrophones for generating a signal, said streamer having means for delivering the signal from the primary circuit in each channel to recording means on the vessel comprising a test circuit located at each channel to be tested adapted to develop a test signal that when imposed in the primary circuit develops a response signal indicative of a characteristic of the channel, a control bus extending from the vessel through the streamer, a control circuit connected to the control bus at each of the channels to be tested operative in response to a control signal delivered by the control bus from the vessel, said test circuit including normally open switch means, means in the control circuit adapted to close the switch means in the test circuit in response to a control signal delivered through the control bus and thereby actuate the test circuit.

12. A system as set forth in claim 11 characterized by the control circuit including current limiting means limiting the current flowing through the control circuit in response to the control signal.

13. A system as set forth in claim 11 characterized by the control circuit including an optoisolator adapted to close the switch means in the test circuit.

14. A system for testing hydrophone channels in a streamer trailing a seismic prospecting vessel, each channel in the streamer having a primary circuit for generating a signal, said streamer having means for delivering the signal generated by the primary circuit in each channel to recording means on the vessel comprising a double-throw switch in the primary circuit, a first test circuit including a relaxation oscillator, a relay in the first test circuit operatively connected to the switch in the primary circuit, a battery, connecting means including a first test circuit switch connecting the relaxation oscillator across the battery, a second test circuit including a resistance, connecting means including a normally open switch connecting the resistance across the battery, said double-throw switch in the test circuit being normally in position connection the second test circuit in the primary circuit, a control circuit connected to a two-wire control bus extending through the streamer from the vessel, control signal generating means on the vessel adapted to selectively impart a positive signal on either of the wires in the control bus, said control circuit having means for closing the normally open switch means in the first test circuit in response to a positive signal on one wire in the control bus and closing the normally open switch means in the second test circuit in response to a positive signal on the other control bus, said relay being operative on closing the normally open switch in the first test circuit to operate the switch in the primary circuit to connect the relaxation oscillator into the primary circuit.

15. A method of testing channels in a seismic streamer while being towed behind a seismic prospecting vessel, said seismic streamer including a plurality of seismic channels connected end to end, a primary circuit in each channel adapted to generate a seismic signal, and means for delivering the seismic signal from each channel to the vessel for separate recording at the vessel comprising delivering from the vessel through the streamer a control signal to activate a test circuit at each of the channels to be tested and develop at test signal indicative of a characteristic of the primary circuit, imposing the test signal on the primary circuit, and delivering through the streamer to recording apparatus on the vessel the response of the primary circuit to the test signal.

* * * * *

UNITED STATES PATENT OFFICE
CERTIFICATE OF CORRECTION

Patent No. 4,166,270            Dated    August 28, 1979

Inventor(s)    Auseklis Brastins and Ralph L. Stenger, Jr.

It is certified that error appears in the above-identified patent and that said Letters Patent are hereby corrected as shown below:

Column 1, line 22, "for" should be --or--.

Column 3, line 35, "metioned" should be --mentioned--.

Column 3, line 54, "with" should be --within--.

Column 5, line 9, "94" should be --84--.

Column 5, line 21, after "transistor" insert --switch--.

Column 7, line 14, "for", second occurrence, should be --from--.

Column 8, line 27, "connection" should be --connecting--.

Column 8, line 51, "at" should be --a--.

Signed and Sealed this

Fourth Day of December 1979

[SEAL]

Attest:

SIDNEY A. DIAMOND

Attesting Officer      Commissioner of Patents and Trademarks